April 19, 1960

B. McCOLLUM 2,933,300

IMPACT SWITCH

Filed March 18, 1957

Burton McCollum
INVENTOR.

BY Frank B. Pagsky

ATTORNEYS

United States Patent Office 2,933,300
Patented Apr. 19, 1960

2,933,300
IMPACT SWITCH
Burton McCollum, Houston, Tex.

Application March 18, 1957, Serial No. 646,838

1 Claim. (Cl. 264—1)

My present invention is a switch designed to respond or change position at the exact moment of maximum acceleration, either positive or negative, of a moving body to which it is attached. It is suitable for use in all installations in which an accurate determination of such an event is desired.

My switch is particularly useful in the art of exploring subsurface geology by means of the seismograph and results in the attainment of more accurate timing of the seismic impulses than has been accomplished heretofore. It is specifically adapted to the method of generation of seismic waves by the dropping of a weight as set out in my copending applications Serial No. 413,297, filed March 1, 1954 now Patent No. 2,851,121, and Serial No. 423,347, filed April 15, 1954 now Patent No. 2,851,122. In those applications there is described a procedure for generating seismic waves by dropping a large weight from a height of a few feet. Since the major part of the seismic impulse is generated at the time the pressure of the weight against the ground is greatest, it is important that any timing device used to indicate the time of this impact be responsive to the maximum pressure. In the method of timing the seismic waves outlined in the above applications, there is described an electrical timing device comprising a body which is affixed to the falling weight. Within this body is a contact terminal which is movable relative thereto. The terminal is held in a normally closed position by a spring until such time as the deceleration, i.e., negative acceleration, of the weight reaches such magnitude that the movable terminal overcomes the spring force and moves away from its contact point, thereby breaking the circuit. In other words, the device is designed in such a manner that the contact will open at some predetermined value of negative acceleration.

This device works well under many conditions, but experience shows that in certain cases it does not give a sufficiently accurate indication of the time of generation of the seismic energy. The reason for this is illustrated in Figs. 1 and 2 of the drawing, wherein.

When the weight falls on a hard surface, at the moment of the impact the deceleration increases very rapidly from the point 1 to a maximum at 2 and then falls off rapidly to a relatively low value in the interval between 2 and 3. If the surface conditions are nearly ideal, i.e., very hard and compact, the peak of the curve will occur in no more than one or two milliseconds, and the switch will open during this brief period and give a satisfactory indication of the time of generation of the seismic wave. However, if the surface on which the weight falls is soft and yielding, as in the case of a thick bed of soft sand or a plowed field, a very different situation exists, as illustrated in Fig. 2. The moment the weight touches the surface there is a certain amount of pressure, and a corresponding amount of deceleration, as at 4, which is usually too small to cause the above described switch to open. As the ground surface is compressed, it develops increasing resistance, causing the deceleration to increase progressively as shown by the parts of the curve 5 and 6 until a maximum deceleration is attained at 7, after which the deceleration diminishes rapidly to some relatively low level as at point 8. Under these conditions the peak of the deceleration attained by the weight will usually be much less than in the case shown in Fig. 1 and the time of opening of the switch will depend on the adjustment of the control spring in relation to the mass of the movable terminal. Thus it may open at or near the point 4, 5 or 6, depending on the values of negative acceleration attained at those points. If the spring is adjusted for an operating curve such as in Fig. 1, it may fail to open when the weight is dropped on a soft and yielding surface because of the relatively low value of the peak deceleration point. Even when the switch functions the error in the time of opening of the contact due to the above cause may be as much as 5 to 10 milliseconds, a very objectionable uncertainty.

Therefore, it is an object of my invention to provide a switch which will function to determine the maximum acceleration, either positive or negative, of a moving body, independently of the magnitude of such acceleration.

More specifically, it is an object of my invention to provide a switch which will respond to the maximum impact of a falling weight, regardless of the surface conditions of the resisting medium.

It is also an object of my invention to provide a switch of the described type which is simple in operation, rugged, and economical.

Figure 1:
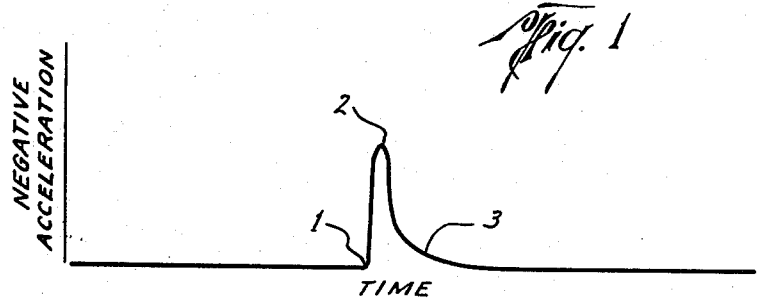
Fig. 1 is a diagram showing how the negative acceleration of a mass varies as a function of time when it strikes ground having a hard surface.
Figure 2:
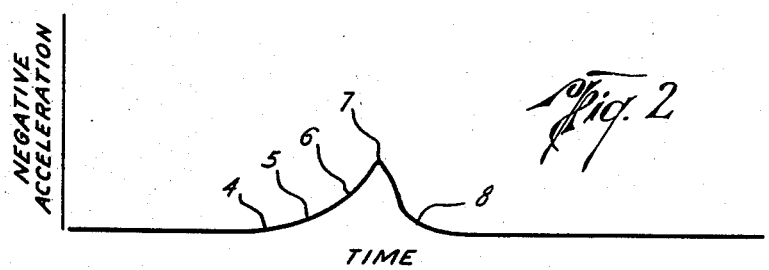
Fig. 2 shows the variation when the mass strikes a soft, yielding surface.

My present invention is based on the presumption, well borne out by experience, that the moment of effective generation of a seismic wave by a falling body coincides with the time of the peak of deceleration of the body, that is, at the point 2 in Fig. 1 or the point 7 in Fig. 2, and my switch is designed to signal an event that always will be associated closely with this peak of deceleration.

I prefer to employ a sensing device which generates a current in an electrical circuit which is connected to the solenoid of a normally closed polarized relay. The direction of the current in the solenoid is reversed as the accelerating force acting on the sensing device passes its peak, and the relay is thereby opened.

Figure 3:
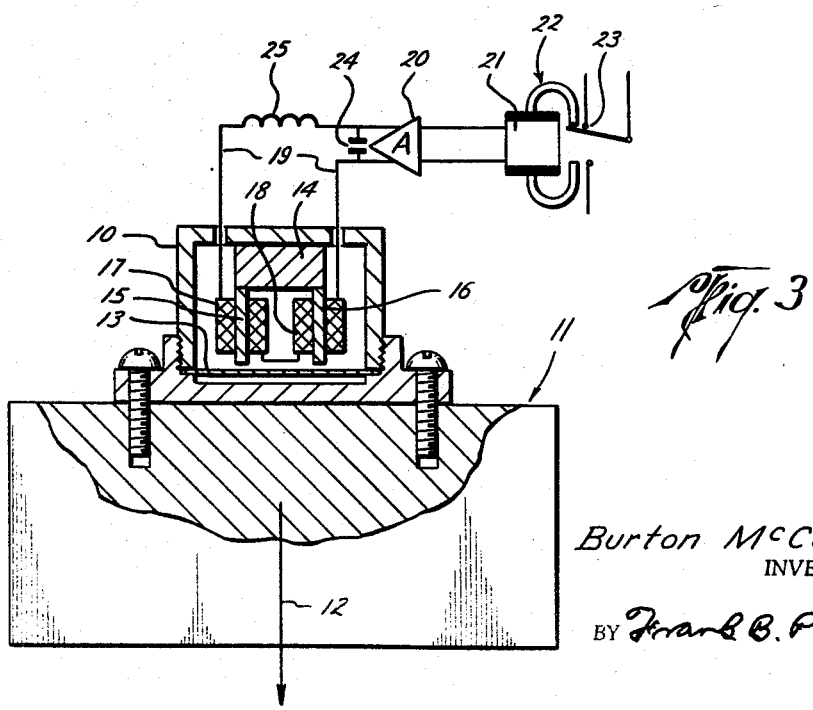
Fig. 3 is a sectional view of the switch attached to a weight.

The basic elements of my switch are shown in Fig. 3 in a diagrammatic view. For the purpose of illustrating one of its applications, the sensing device 10, similar to an ordinary telephone receiver, is fixed to a body 11 moving in the direction shown by arrow 12. In the sensing device, a soft iron diaphragm 13 serves the double purpose of armature and inertia weight in the magnetic circuit established by permanent magnet 14 and its two associated pole pieces 15 and 16. The pole pieces are of a soft magnetic material such as soft iron. In the arrangement shown, any deceleration of the moving body 11 causes the diaphragm 13 to move downward away from the pole pieces 15 and 16, thereby reducing the magnetic flux linking with the surrounding interconnected coils 17 and 18 and inducing a voltage therein. It will readily be seen that as long as the deceleration is increasing, there will be a current moving in a certain direction in the coils 17 and 18 because the diaphragm 13 is receding farther and farther away from the pole pieces. While the body 11 is at rest or while its deceleration remains constant, no voltage or current will be induced. However, if the deceleration starts to diminish, as it does on passing through a maximum, as at points 2 and 7 of Figs. 1 and 2 respectively, the direction of the induced current will be reversed by movement of the diaphragm toward the pole pieces. If now we bring the leads 19 out, preferably through an amplifier 20, to the solenoid 21 of a polarized relay 22, the contact 23 of which is normally closed, and if we phase the connections so that the current generated in the relay coils while the rate of deceleration is increasing will tend to hold the relay contact 23 closed, it will be evident that during the interval exemplified by the points 1 to 2 inclusive of Fig. 1, and 5 to 7 inclusive of Fig. 2, during which the negative acceleraion increases, the contact 23 will remain closed. However, after the deceleration passes a maximum, a reverse current is sent through the solenoid 21 of the relay 22 which opens the contact 23, thereby signalling the instant that most precisely coincides the time of generation of the seismic wave.

In order for the arrangement above outlined to function efficiently, the natural frequency of the diaphragm 13 should be very high, preferably several thousand cycles per second or higher. I prefer also to insert in the circuit between the sensing element and the amplifier a low pass filter exemplified by the condenser 24 and the inductor 25. This will virtually eliminate the undamped vibrations of the diaphragm 13 and permit only a current characteristic of the deceleration rate to flow. Alternatively, a suitable damping fluid can be placed inside the sensing device 10 to give critical damping to the diaphragm 13.

I have chosen to illustrate but a single application of my switch, and it is apparent that the structure described will mark the moment of maximum positive or negative acceleration of any body to which it is affixed, the positive peak being evidenced by a closing of the relay. Further, by reversing the connection of the leads to the solenoid of the polarized relay, the device can be made to indicate maximum negative acceleration by a closing of the relay and maximum positive acceleration by an opening of the relay. A substitution of a normally open relay for the normally closed relay also will result in a workable device, this innovation also being embraced within the present invention.

I prefer to use a polarized relay to mark the exact moment of the reversal of current. However, the movement of the sensing device inertia weight could be used to modulate the current in an electrical circuit as by electrostatic or electromagnetic induction, the making or breaking of an electrical contact as described above being a special case of such modulation.

Obviously, any type of accelerometer, whether employing varying resistance, piezo-electric properties, or magnetostriction, can be adapted to accomplish the purpose herein set out if it produces a current which reverses in direction as the acceleration of the body to which it is attached passes its peak. The essence of my invention rests broadly in the use of any similar principle whereby the direction of the induced current is detected by electrical current responsive means to indicate the instant of maximum acceleration, either positive or negative, of the body to which the accelerometer is attached. Accordingly, it is desired to protect by Letters Patent all forms of the invention falling within the scope of the following claim.

I claim:

In seismic exploration, apparatus for indicating the instant of maximum negative acceleration of a vertically decelerating body comprising a current generating element attached to said body, said current generating element comprising a permanent magnet, pole pieces associated therewith, an inertia element adjacent said pole pieces and adapted for vertical movement in opposite directions relative thereto in response to increasing and decreasing negative acceleration, and a coil within the magnetic field of said permanent magnet; and a polarized relay electrically connected to the said coil so as to change position at the instant of reversal of direction of the current produced by said current generating element.

References Cited in the file of this patent

UNITED STATES PATENTS

| | | |
|---|---|---|
| 1,948,104 | Firestone | Feb. 20, 1934 |
| 2,574,600 | Stokes | Nov. 13, 1951 |
| 2,643,869 | Clark | June 30, 1953 |

FOREIGN PATENTS

| | | |
|---|---|---|
| 847,119 | Germany | Aug. 21, 1952 |

OTHER REFERENCES

"A new electro-magnetic seismograph" (Benioff), from "Fifth Pacific Science Conference," 1935 (pages 2443–2450).

Gough: "A New Instrument for Seismic Exploration at Very Short Ranges," Geophysics Magazine, vol. 17, April 1952, pages 311–321, 330–333.

"A New Approach to Seismic Exploration" (Palmer), from "World Oil," volume 138, No. 7, June 1954 (pages 140 and 142).